United States Patent
Tanigawa et al.

(10) Patent No.: US 6,218,046 B1
(45) Date of Patent: *Apr. 17, 2001

(54) POSITIVE ELECTRODE MATERIAL FOR ALKALINE STORAGE BATTERY AND METHOD OF PRODUCING THE SAME

(75) Inventors: Futoshi Tanigawa, Fugisawa; Masumi Katsumoto, Chigasaki; Fumio Kato, Moriguchi; Tatsuhiko Suzuki, Kamakura; Yoshitaka Dansui, Fujisawa; Kohji Yuasa, Chigasaki, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/146,121

(22) Filed: Sep. 2, 1998

(30) Foreign Application Priority Data

Sep. 10, 1997 (JP) .................................................. 9-245041
Jul. 3, 1998 (JP) .................................................. 10-188637

(51) Int. Cl.⁷ ...................................................... H01M 4/32

(52) U.S. Cl. ........................ 429/223; 423/594; 252/521.2

(58) Field of Search ........................... 429/223; 423/594; 252/521.2; 205/60

(56) References Cited

U.S. PATENT DOCUMENTS

| 5,032,475 | * | 7/1991 | Hasebe et al. . |
| 5,629,111 |   | 5/1997 | Yamawaki et al. . |
| 5,672,447 | * | 9/1997 | Yamawaki et al. .................. 429/223 |
| 5,788,943 | * | 8/1998 | Aladjov ............................. 429/223 X |
| 6,083,642 | * | 7/2000 | Kato et al. . |

FOREIGN PATENT DOCUMENTS

| 0 757 395 A1 | 2/1997 | (EP) . |
| 0 866 510 A2 | 9/1998 | (EP) . |
| 08148145 | 6/1996 | (JP) . |
| 09073900 | 3/1997 | (JP) . |

\* cited by examiner

Primary Examiner—Carol Chaney
Assistant Examiner—Susy Tsang
(74) Attorney, Agent, or Firm—Akin, Gump, Strauss, Hauer & Feld, L.L.P.

(57) ABSTRACT

The present invention provides a positive electrode material for alkaline storage batteries which has high energy density and causes little capacity reduction even when a charge/discharge cycle is repeated at high temperatures. The positive electrode material for alkaline storage batteries of the present invention comprises nickel hydroxide particles and a layers of cobalt oxide coating the nickel hydroxide particles. A valence of cobalt of the cobalt oxide is greater than 3.0, and the cobalt oxide contains sodium ions or potassium ions inside the crystal and further fixes lithium hydroxide or lithium ions.

11 Claims, 4 Drawing Sheets

POSITIVE ELECTRODE MATERIAL FOR ALKALINE STORAGE BATTERY AND METHOD OF PRODUCING THE SAME

BACKGROUND OF THE INVENTION

The present invention relates to a positive electrode material for alkaline storage batteries, more particularly to an active material for a non-sintered type positive electrode for alkaline storage batteries, and a method of producing the same.

With the recent popularization of portable equipments, realization of high capacity has been required strongly to an alkaline storage battery. Particularly, a nickel-metal hydride storage battery, which is a secondary battery comprising a positive electrode mainly using nickel hydroxide as an active material and a negative electrode using a hydrogen storage alloy as a main material, has rapidly been popularized as a secondary battery having high capacity and high reliability.

The positive electrode for alkaline storage batteries will be described hereinafter.

The positive electrode for alkaline storage batteries is roughly classified into two types, e.g. sintered type and non-sintered type. The former is produced by impregnating a porous nickel sintered plaque having a porosity of about 80%, obtained by sintering a core material such as a perforated metal and a nickel powder, with an aqueous solution of a nickel salt such as nickel nitrate, followed by impregnating with an alkaline solution, thereby to form nickel hydroxide in the porous nickel sintered plaque. Regarding this positive electrode, it is difficult to make the porosity of the plaque larger than that of a conventional positive electrode and, therefore, an amount of the active material to be filled can not be increased, which results in limit of high capacity.

The latter non-sintered type positive electrode is produced, for example, by filling a three-dimensionally continuous porous foamed nickel substrate having a porosity of not less than 95% with nickel hydroxide particles as disclosed in Japanese Laid-Open Patent Sho 50-36935, and is widely used as a positive electrode for high-capacity alkaline storage battery.

As an active material for the non-sintered type positive electrode, spherical nickel hydroxide particles having high bulk density and filled in a foamed substrate are used in view of realization of high capacity. As the nickel hydroxide particles, metallic ions of cobalt, cadmium, zinc, or the like are generally incorporated in part with the nickel hydroxide particles in view of the improvement of discharge characteristic, charge acceptance and cycle life. Regarding the porous foamed substrate used in the non-sintered type positive electrode, the pore size is from about 200 to 500 $\mu$m and these pores are filled with spherical nickel hydroxide particles having a particle diameter of several $\mu$m to several tens $\mu$m. The charge/discharge reaction of the nickel hydroxide particles, which are present in the vicinity of a skeleton of the substrate where current collection is satisfactorily performed, proceeds smoothly, but the reaction of the nickel hydroxide particles which are present apart from the skeleton does not proceed sufficiently.

Accordingly, in the non-sintered positive electrode, means for electrically connecting nickel hydroxide particles by using a conductive agent are employed so as to improve the utilization of the filled nickel hydroxide particles. As the conductive agent, a single metal such as cobalt, nickel, etc. is used sometimes, but a divalent cobalt oxide such as cobalt hydroxide, cobalt monoxide, etc. is used in many cases.

These divalent cobalt oxides have no conductivity, intrinsically. It is considered, however, these divalent cobalt oxides are electrochemically oxidized by initial charging in the battery to be converted into P-cobalt oxyhydroxide having the electric conductivity, which effectively serves as a conductive network. By the presence of this conductive network, it becomes possible to greatly enhance the utilization of nickel hydroxide particles filled in high density in the non-sintered type positive electrode, thereby to realize high capacity compared with the sintered type positive electrode.

However, even in the non-sintered positive electrode having the above described construction, the conductive performance of the network is not perfect and there is a limit in utilization of the nickel hydroxide particles. Furthermore, the above positive electrode has a drawback that, when a battery is overdischarged or allowed to stand in the state of short circuit, or stored for a long period of time or stored at high temperatures, the positive electrode capacity is reduced.

This is because divalent cobalt oxide cannot be completely converted into β-cobalt oxyhydroxide by the above described electrochemical oxidation reaction.

Recently, as means for improving the imperfection of the above positive electrode conductive network, Japanese Laid-Open Patent Hei 8-148145 (or U.S. Pat. No. 5,629,111) discloses a technique of heating (oxidizing) a cobalt hydroxide in a positive electrode material in the presence of an aqueous alkaline solution and oxygen (air) outside the battery, thereby to convert into a cobalt oxide having a distorted crystal structure and a cobalt valence higher than 2. The patent publication discloses oxidation to a cobalt oxide having a valence of about 2.9 and characteristics of a battery using the same.

The above publication further discloses that nickel hydroxide particles having a coating layer of a cobalt hydroxide (hereinafter referred to as $Co(OH)_2$-coated nickel hydroxide particles) are subjected to the above heating treatment. The $Co(OH)_2$-coated nickel hydroxide particles are prepared by using a method of stirring nickel hydroxide particles in an aqueous solution of a divalent cobalt salt and adjusting the pH while adding dropwise an aqueous alkaline solution, thereby to deposit a cobalt hydroxide on the surface of the particles (liquid phase method), or a method of adding a cobalt hydroxide powder to nickel hydroxide particles and coating the surface of the nickel hydroxide particles with the cobalt hydroxide utilizing an action of a shear force or an impact force due to mechanical mixing (mechanical mixing method), and have been known for a long time as means for enhancing the dispersibility of cobalt in the positive electrode.

When the $Co(OH)_2$-coated nickel hydroxide particles are subjected to the above heat-treatment, there can be obtained a positive electrode material capable of providing a considerably good conductive network by the combination of high dispersibility of the cobalt and bonding of the interface between the nickel hydroxide mother particles and the coating layer as the oxidation of cobalt proceeds even if the amount of cobalt used is small.

As the method for production of the above positive electrode material, Japanese Laid-Open Patent Hei 9-73900 discloses a method of flowing $Co(OH)_2$-coated nickel hydroxide particles containing an aqueous alkaline solution in a batch fluidized drier, or heating the particles with dispersing. According to this method, there is an advantage that agglomeration of particles due to the treatment can be prevented.

However, the oxidation condition of the cobalt hydroxide constituting the coating layer on the surface of the active material particles is not satisfactory in the positive electrode material for alkaline storage batteries disclosed in the above publication and there still exists some room for improvement. This is because proceeding of the oxidation of the cobalt hydroxide in the presence of alkali greatly depends not only on the ambient temperature and the concentration of an aqueous alkaline solution which is present around the cobalt hydroxide, but also on humidity and oxygen concentration of the environment, so that it is impossible to prevent unreacted cobalt hydroxide from remaining and a side reaction from occurring.

Considering this point, the inventors of the present invention have conducted detailed experiments and analyses and suggested that the utilization of a positive electrode material should be improved by oxidizing the cobalt oxide constituting the coating layer to γ-cobalt oxyhydroxide with cobalt valence of larger than 3.0. The γ-cobalt oxyhydroxide contains a large amount of alkali cation ($K^+$ or $Na^+$) in the crystal. A positive electrode comprising above-mentioned γ-cobalt oxyhydroxide is disclosed in U.S. patent application Ser. No. 08/991,415 filed Dec. 16, 1997, which is incorporated herein by reference in its entirely.

However, it has turned out that although when the cobalt oxide constituting the coating layer has a cobalt valence larger than 3.0, the characteristics of the positive electrode material are greatly improved; there is a drawback that the capacity is more deteriorated than those of conventional positive electrodes as the charge/discharge cycle is repeated at high temperatures.

That is, when a battery is discharged until the battery voltage reaches around 0.8V at high temperatures, namely 40° C., part of the cobalt oxide constituting the coating layer of the active material particles causes discharge reaction (reduction) at the end of the discharging. The reason for this is that the positive electrode is likely to discharge at high temperatures since the internal resistance of the battery decreases and that the cobalt oxide has extremely high electric conductivity due to a large valence of cobalt. In addition, alkali cation ($K^+$ or $Na^+$) contained in the cobalt oxide eliminates although the amount is very small.

When the battery is charged, a charge reaction (oxidation) of the above-mentioned discharged cobalt oxide may occur at the beginning of the charging. However, the capacity to charge the cobalt oxide becomes slightly smaller than the discharged capacity due to the elimination of alkali cation during the discharging and other reasons. That is, when a charge/discharge reaction is conduced at high temperatures, the cobalt valence of the cobalt oxide constituting the coating layer slightly decreases. Then, the charge/discharge cycle is repeated at high temperatures, the above-mentioned phenomena are accumulated, and as a result, the cobalt oxide of the coating layer approaches a thermodynamically stable structure such as CoO(OH) or $Co_3O_4$ (both are oxides with poor electric conductivity) while decreasing the cobalt valence. Consequently, the performance of the conductive network of the positive electrode becomes insufficient, which decreases the capacity.

BRIEF SUMMARY OF THE INVENTION

An object of the present invention is to solve the above problems and to provide a positive electrode material for alkaline storage batteries that maintains excellent characteristics of the cobalt oxide constituting a coating layer and having a large cobalt valence and that causes little capacity reduction even when the charge/discharge cycle is repeated at high temperatures.

The present invention provides a positive electrode material for alkaline storage batteries comprising nickel hydroxide particles and a cobalt oxide layer which coats the nickel hydroxide particle, the cobalt oxide having a cobalt valence larger than 3.0 and containing sodium ions or potassium ions inside the crystal and fixing lithium hydroxide or lithium ions.

The nickel hydroxide particles used in this case are preferably a solid solution incorporated with metallic ions of cobalt, cadmium, zinc, or the like therein, in view of the improvement of discharge characteristic, charge acceptance and cycle life.

The cobalt oxide fixes the lithium hydroxide or lithium ions by chemical adsorption.

Alternatively, the cobalt oxide incorporates therein the lithium ions to form a solid solution to fix them.

The present invention also provides a method of producing a positive electrode material for alkaline storage batteries comprising a first step of heating nickel hydroxide particles having a coating layer of cobalt hydroxide in the presence of an aqueous solution of either potassium hydroxide or sodium hydroxide whose concentration is larger than 40% by weight, thereby to convert the cobalt hydroxide into γ-cobalt oxyhydroxide through air oxidation and a second step of immersing the particles in an aqueous lithium hydroxide solution.

In a preferred mode of the present invention, the concentration of the aqueous lithium hydroxide solution is 0.5 mol/kg or more.

In another preferred mode of the present invention, the temperature of the aqueous lithium hydroxide solution is from 60 to 95° C.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The positive electrode material of the present invention comprises nickel hydroxide particle and a cobalt oxide layer which coats the nickel hydroxide particle, the cobalt oxide having a cobalt valence larger than 3.0 and containing potassium ions or sodium ions inside the crystal and fixing lithium hydroxide or lithium ions.

The positive electrode material is produced by a first step of heating nickel hydroxide particle having a coating layer of cobalt hydroxide in the presence of an aqueous solution of either potassium hydroxide or sodium hydroxide whose concentration is larger than 40% by weight, thereby to convert the cobalt hydroxide into γ-cobalt oxyhydroxide through air oxidation and a second step of immersing the particles subjected to the first step in an aqueous lithium hydroxide solution.

When the concentration of the aqueous lithium hydroxide solution used in the second step is 0.5 mol/kg or more and the temperature of the solution is within a range of from 60 to 95° C., lithium hydroxide or lithium ions can be fixed in a stable manner to the cobalt oxide constituting a coating layer.

It is considered that the lithium ions are fixed to the cobalt oxide by being incorporated therein to form a solid solution and the lithium hydroxide are fixed by chemical adsorption onto the crystallite surface of the cobalt oxide. The lithium hydroxide or lithium ions fixed to the cobalt oxide of the coating layer have an effect of preventing alkali cation ($K^+$ or $Na^+$) from departing from the cobalt oxide or the cobalt oxide from changing its structure when the charge/discharge of a battery is repeated at high temperatures. Consequently, it becomes possible to provide an alkaline storage battery which has high energy density and whose capacity hardly reduces even after a charge/discharge cycle is repeated under a high temperature condition.

The amount of lithium ion to be fixed to the coating layer is preferably in a range of 0.10 to 0.50 in an atomic ratio to cobalt. If fixed less than this range, lithium ion fails to produce an improving effect on the charge-discharge cycle characteristics at high temperatures. If fixed more than this range, it may change the crystal structure of the cobalt oxide, which results in reduced electronic conductivity, making it impossible to have a satisfactory utilization of the active material. It is preferable for the lithium hydroxide to be fixed to the coating layer in a similar range to the lithium ion on lithium basis.

The potassium ion ($K^+$) or sodium ion ($Na^+$) to be contained in the cobalt oxide of the coating layer is preferably in a range of 0.20 to 0.33 in an atomic ratio to cobalt. It is preferable for the nickel hydroxide particle to have a mean diameter of 5 to 20 μm. It is also preferred that the coating layer is 0.2 μm in thickness and coats substantially the entire surface of each nickel hydroxide particle.

The Example of the present invention will be detailed as follows.

(1) Preparation of Active Material Particles

Nickel hydroxide particles as mother particles of an active material were synthesized by using the following known technique. That is, an aqueous solution containing nickel sulfate as a main component and cobalt sulfate and zinc sulfate in a predetermined amount was prepared. To this aqueous solution, sodium hydroxide was slowly added dropwise with adjusting the pH of the solution with an aqueous ammonia, thereby to deposit spherical nickel hydroxide particles with cobalt and zinc incorporated therein. The nickel hydroxide particles thus obtained were washed with water and then dried to obtain mother particles.

The above nickel hydroxide particles were charged in an aqueous cobalt sulfate solution and an aqueous sodium hydroxide solution was slowly added dropwise, followed by continuous stirring with adjusting so that the pH of the aqueous solution at 35° C. is maintained at 12, thereby to deposit cobalt hydroxide on the surface of the nickel hydroxide particles. As a result, $Co(OH)_2$-coated nickel hydroxide particles were obtained.

A weight of the cobalt hydroxide coating layer was adjusted so that a weight ratio of the coating layer to the total weight of the $Co(OH)_2$-coated nickel hydroxide particles becomes 5.0% by weight. The obtained $Co(OH)_2$-coated nickel hydroxide particles were washed with water and then vacuum-dried. It was confirmed by the measurement using a laser diffraction type particle size distribution meter that the $Co(OH)_2$-coated nickel hydroxide particles thus obtained have an average particle diameter of about 10 μm. It was also confirmed by the observation using a scanning electron microscope (SEM) and a transmission electron microscope (TEM) that the cobalt hydroxide of the coating layer has a thickness of about 0.1 μm and the whole surface of the particles is coated with the coating layer. The BET specific surface area of the particles was about 7 $m^2/g$.

The conversion treatment of $Co(OH)_2$-coated nickel hydroxide particles was conducted as follows. The $Co(OH)_2$-coated nickel hydroxide particles were impregnated with an appropriate amount of a 45% by weight aqueous sodium hydroxide solution and charged in a drier equipped with microwave heating means, thereby to completely dry the particles by supplying oxygen. As a result of this operation, the cobalt hydroxide coating layer on the particle surface was oxidized and the particles were turned indigo. This is the completion of the first step.

After the first step, an aqueous lithium hydroxide solution whose concentration was 1.0 mol/kg was charged in the drier at 80° C., thereby to form a slurry, which was stirred for 30 minutes. This is the completion of the second step. The slurry was taken out of the drier and washed well with water and dried, thereby to obtain active material particles A. In addition, active material particles B were produced in the same manner as above except that an aqueous sodium hydroxide solution was used in place of an aqueous potassium hydroxide solution in the first step.

Particles which obtained by using an aqueous potassium hydroxide solution in the first step and not being subjected to the second step were washed well with water and dried, thereby to obtain active material particles C. Particles which obtained by using an aqueous sodium hydroxide solution in the first step and not being subjected to the second step were washed well with water and dried, thereby to obtain active material particles D.

These active material particles A to D all had an indigo color with little difference.

(2) Preparation and Evaluation of Battery

In order to compare the characteristics of the above obtained positive electrode material samples A to D, batteries were prepared in the following procedure and evaluated. First, pure water was added to each of the samples A to D so as to make active material paste. A porous foamed nickel substrate having a porosity of 95% and a thickness of 1.1 mm was filled with a predetermined amount of this active material paste. Then, the substrate was dried in a drier at 80° C., and pressed by rolls to a thickness of about 0.7 mm. The resultant was cut into pieces having a predetermined size, thereby to obtain a nickel positive electrode corresponding to the active materials A to D.

These four kinds of nickel positive electrodes were each combined with a negative electrode of a hydrogen storage alloy, a separator of a hydrophilized polypropylene nonwoven fabric, and an alkaline electrolyte mainly composed of potassium hydroxide of 7 to 8N, thereby to produce a nickel-metal hydride storage battery of a 4/3 AAA (L-AAA) size with a nominal capacity of 750 mAh by a well-known method. The respective batteries were tested by the method described in the following items (1) and (2), and the utilization of the respective positive electrodes and high-temperature cycle life were evaluated.

(1) Utilization

At 20° C., each of the above batteries was charged at a charge rate of 0.1 CmA for 15 hours and then discharged at a discharge rate of 0.2 CmA until a voltage of the battery is reduced to 1.0 V, and the battery capacity was measured. The capacity of the battery thus measured was divided by a theoretical capacity of the positive electrode (value obtained by multiplying the weight of the nickel hydroxide filled in the positive electrode by the electric capacity 289 mAh/g obtained when nickel hydroxide performs one electron reaction), thereby to calculate the utilization of each positive electrode material.

TABLE 1

| Active material | A | B | C | D |
|---|---|---|---|---|
| Utilization (%) | 105.9 | 105.7 | 105.8 | 105.9 |

Table 1 shows that these four kinds of positive electrode materials have no difference in utilization, exhibiting an extremely high value exceeding 100%. The process in the first step provides cobalt hydroxide constituting the coating layer of active material particles severe oxidation, and the cobalt valence becomes larger than 3.0. In this case, the cobalt oxide contains an alkali metal ($K^+$, $Na^+$) and water in the crystal. The color of indigo of the active material particles indicates the electronic condition of the cobalt oxide. The cobalt oxide having a valence larger than 3.0 has an extremely high electronic conductivity. Furthermore, the use of $Co(OH)_2$-coated nickel hydroxide particles as the original material to produce a positive electrode material further improves the current collection of the conductive network by the cobalt of the produced positive electrode. For these reasons, the positive electrode materials A to D have extremely high utilization.

(2) High-temperature cycle life

After the evaluation of (1) was completed, a cycle of charging each battery at a charge rate of 1 CmA at 40° C. by –ΔV control system (charging is stopped when the charging voltage reaches a peak voltage and then drops by 5 mV from the peak voltage), and then discharging at a discharge rate of 1 CmA until a voltage of the battery is reduced to 0.8 V was repeated 500 cycles and a capacity was measured.

Figure 1:
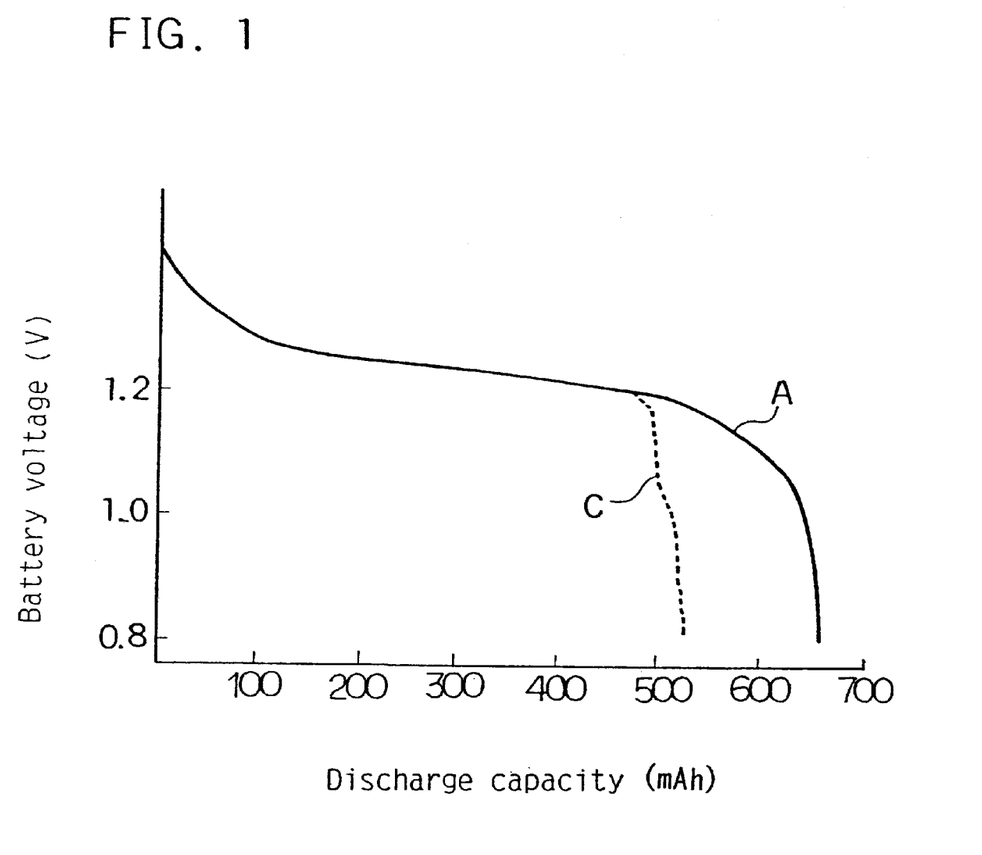
FIG. 1 is a graph showing discharge curves of the batteries which use active material A of the Example of the present invention and active material C of the Comparative Example, respectively, when charge/discharge is repeated for 300 cycles at high temperatures.

FIG. 1 is a graph showing discharge curves of the batteries which use active material particles A and C, respectively, when a charge/discharge is repeated for 300 cycles. As apparent from FIG. 1, the battery which used the active material C subjected to the first step but not to the second step had an incomplete discharge at the end, and as a result, the capacity was reduced. In contrast, the battery which used the positive electrode material A subjected to the second step showed little reduction in capacity. The similar tendency was observed in the batteries which used active material particles B and D, respectively.

Figure 2:
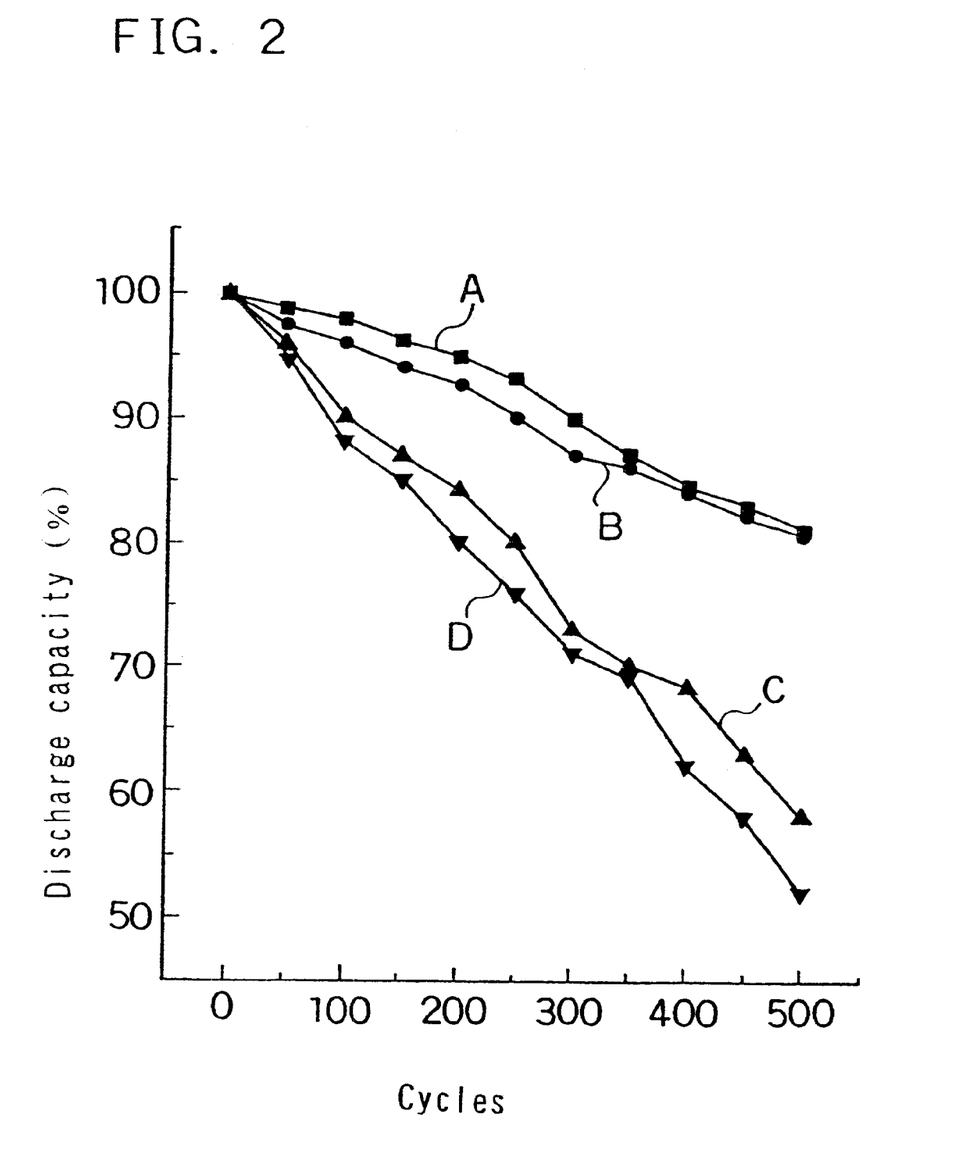
FIG. 2 is a graph showing changes in battery capacity along with the charge/discharge cycle at high temperatures of the batteries which use active materials A and B of the Example of the present invention and active materials C and D of the Comparative Example, respectively.

As shown in FIG. 2 where battery capacities change along with the charge/discharge cycles, the batteries which used active materials A and B maintained not less than 80% of the initial capacity even after a charge/discharge was repeated for 500 cycles. In FIG. 2, the battery capacity at the first cycle corresponds to 100.

(3) Analysis of Active Material Particles

In order to clarify the cause of the above difference in cycle life characteristics under a high temperature condition, active material particles A to D were analyzed. First of all, a predetermined amount of the active material particles A to D was completely dissolved in an acid so as to conduct an ICP emission spectral analysis, thereby to measure an amount of an alkali cation ($K^+$, $Na^+$, and $Li^+$) contained in the cobalt compound constituting the coating layer. As a result, the active material particles C and D subjected only to the first step contained about 20 of $K^+$ or $Na^+$ when the molar amount of the cobalt atom of the coating layer was 100. Although the amounts of $K^+$ or $Na^+$ contained in the active material particles A and B subjected to the second step were not so different from those of the active materials C and D, it was confirmed that about 30 of $Li^+$ existed when the molar amount of the cobalt atom of the coating layer is 100. These analysis results are shown in Table 2.

TABLE 2

| Active material | A | B | C | D |
|---|---|---|---|---|
| Content rate of $k^+$ | 21.8 | — | 22.9 | — |
| Content rate of $Na^+$ | — | 22.7 | — | 23.0 |
| Content rate of $Li^+$ | 33.1 | 30.5 | — | — |

* These values are obtained when the molar weight of the cobalt of the coating layer is 100.

As the result of the oxidation in the first step, the cobalt oxide of the coating layer can reach a highly oxidized state where the cobalt valence exceeds 3.0 and the crystal has many defects. From this, it is surmised that in the second step for immersing the particles subjected to the first step in an aqueous lithium hydroxide solution for a short period of time, there is a phenomenon that lithium ions intrude into defected portions inside the crystallite of the cobalt oxide constituting the coating layer to form a solid solution or lithium hydroxide performs chemical adsorption on the interface of crystallite-crystallite, and as a result, lithium hydroxide or lithium ions are fixed on the coating layer. Although the details are not known, it is considered that the provision of the second step does not cause a large change in crystal structure of the cobalt oxide of the coating layer because there was little difference observed in utilization of the four kinds of active materials as described above.

In order to understand an electrochemical behavior of these four kinds of active material particles, a porous foamed nickel substrate of 1 cm×1 cm welded with a lead wire was filled with each active material particles, and then pressed, thereby to produce test electrodes. By using these test electrodes, the measurement of cyclic volutammetry was conducted under the following conditions.

Electrolyte: an aqueous KOH solution having a concentration of 31% by weight

Counter electrode: hydrogen storage alloy negative electrode having sufficient capacity (activated by repeating charge/discharge in combination with another positive electrode)

Reference electrode: Hg/HgO

Sweep condition:
to +350 mV (against counter electrode) on oxidation side
to –250 mV (against counter electrode) on reduction side
300 cycles at a sweep rate of 3 mV/sec.
Ambient temperature: 40° C.

Figure 3:
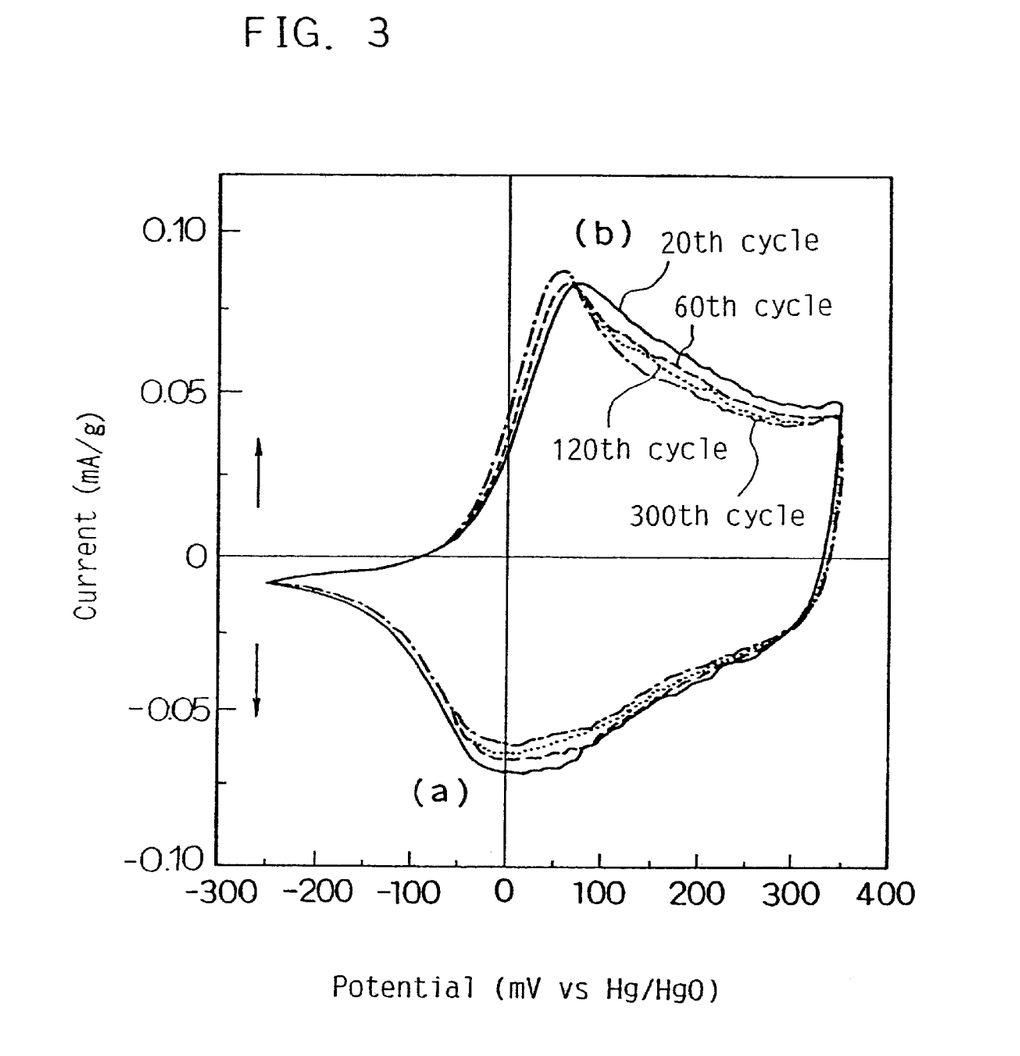
FIG. 3 is a graph showing current-voltage curves obtained by cyclic volutammetry of active material A of the Example of the present invention.
Figure 4:
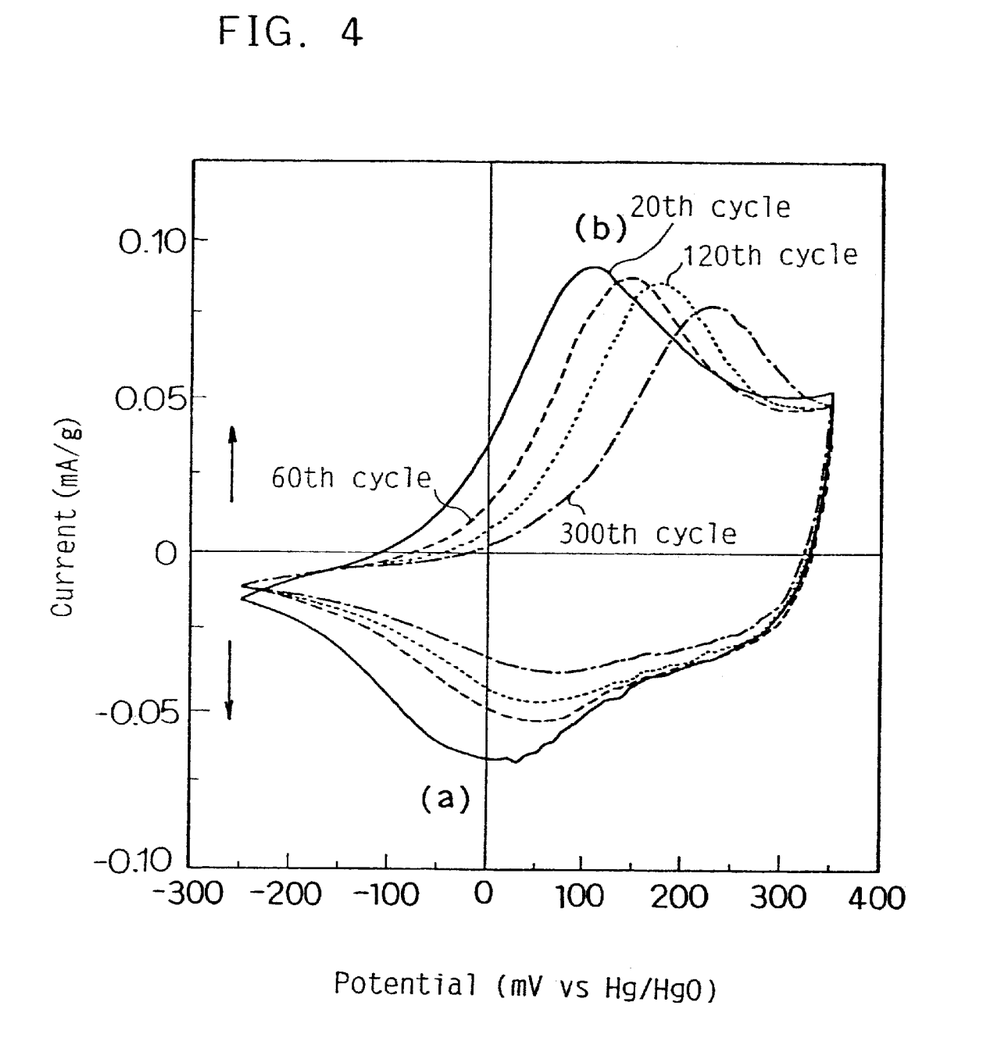
FIG. 4 is a graph showing current-voltage curves obtained by cyclic volutammetry of active material C of the Comparative Example.

The results of the cyclic volutammetry of the electrodes which used active material particles A and C are shown in FIGS. 3 and 4, respectively. It is considered that a reduction current peak "a" observed around 0 mV and an oxidation current peak "b" observed around 100 mV correspond to the reduction and the oxidation of the cobalt oxide constituting the coating layer of the active material particles, respectively, judging from their potential regions. Since the potential sweep rate of the test is pretty high, it is difficult to make the peaks strictly correspond to the charge/discharge cycle in an actual battery. However, these peak behaviors qualitatively indicate the occurrence of reduction of cobalt oxide at the end of discharging and oxidation of cobalt oxide at the beginning of the subsequent charging in an actual battery.

As shown in FIG. 3, no obvious changes in size of the reduction current peak "a" are observed in the active material particles A subjected to the immersing in an aqueous lithium hydroxide solution during the preparation of particles (second step) even after charge/discharge is repeated for 300 cycles. Although the oxidation current peak "b" tends to shift to a rather base potential direction, the peak intensity (area) hardly changes. This indicates that when a charge/discharge cycle is repeated at high temperatures if reduction of the cobalt oxide constituting the coating layer of nickel hydroxide particles proceeds at the end of the discharging (this is due to a sufficient increase in electric conductivity of the cobalt oxide and the valence of the cobalt produced in the first step), the cobalt oxide is reversibly oxidized at the beginning of the subsequent charging, maintaining a high conductivity performance. The behaviors similar to these were observed in experiments about active material particles B.

As shown in FIG. 4, on the other hand, with regard to the active material particles C not subjected to the second step, the reduction current peak "a" decreases while shifting to a noble potential direction along with the procedure of the charge/discharge cycle, and the oxidation current peak "b" also shifts to a noble potential direction. The decrease in the reduction current peak "a" corresponds to a decrease in the conductivity of the cobalt oxide constituting the coating layer of the nickel hydroxide particles (a decrease in conductivity makes it impossible to discharge) as the charge/discharge cycle proceeds.

The shift of the two peaks to a noble potential direction as the charge/discharge cycle proceeds indicates that the oxidation-reduction potential of the cobalt oxide shifts to a noble direction. Namely, it is considered that the containing of alkali cation ($K^+$ in this case) or water molecules in the crystal at the beginning makes the oxidation-reduction potential which has been kept at a low level increases along the elimination of alkali cation. In fact, when the active material particles after the measurement of cyclic volutammentry of 300 cycles were taken out, washed well with water, and subjected to the above mentioned ICP emission spectral analysis, a decrease in alkali cation ($K^+$ in this case) contained in the active material particles was observed. The same behavior as above was observed in the experiments about the active material particles D. The results of the analysis are shown in Table 3.

TABLE 3

| Active material | | C | D |
|---|---|---|---|
| Content rate of $K^+$ or $Na^+$ | Initial | 22.9 | 23.0 |
| | After 300 cycles | 4.6 | 3.3 |

* These values are obtained when the molar weight of the cobalt of the coating layer 100.

From the results of these analyses, the following is surmised about the cycle life characteristics at high temperatures.

That is, the cobalt oxide constituting the coating layer reaches conditions having excellent conductivity and high cobalt valence by the first step. However, when a battery is discharged at high temperatures, namely 40° C. until the battery voltage reaches around 0.8V, some of the cobalt oxide causes a discharge reaction (reduction) at the end of the discharging. At this moment, alkali cation ($K^+$ or $Na^+$) contained in small amount in the cobalt oxide is eliminated, and at the beginning of the subsequent charging, there causes a charging reaction (oxidation) of the cobalt oxide.

However, the elimination of alkali cation during the discharging or other problems cause changes in oxidation-reduction potential, so that the capacity to charge the cobalt oxide becomes slightly smaller than the discharged capacity. That is, when charge/discharge is conducted at high temperatures, the cobalt valence of the cobalt oxide constituting the coating layer slightly decreases. When the charge/discharge cycle is repeated at high temperatures, these phenomena are accumulated. Then, the cobalt oxide of the coating layer approaches a thermodynamically stable structure such as $CoO(OH)$ or $Co_3O_4$ (both are oxides with poor electric conductivity) while decreasing the cobalt valence. Consequently, the performance of the conductive network of the positive electrode becomes insufficient. It is considered that the capacity of the active material particles C and D is deteriorated along with the procedure of the charge/discharge cycle at high temperatures because of the above reasons.

On the other hand, when the immersing in the aqueous lithium hydroxide solution (second step) is conducted after the first step, there is a phenomenon that lithium ions intrude into defected portions inside the crystallite of the cobalt oxide constituting the coating layer to form a solid solution or lithium hydroxide performs chemical adsorption on the interface of crystallite-crystallite, and as a result, lithium hydroxide or lithium ions are fixed on the coating layer of the nickel hydroxide particles. As the results of cyclic volutammetry experiments indicate, the lithium hydroxide or the lithium ions thus fixed restricts the elimination of alkali cation ($K^+$ or $Na^+$) from the cobalt oxide along with the charge/discharge and changes in oxidation-reduction potential.

Consequently, the charge/discharge reaction of the cobalt oxide becomes reversible and maintains high conductive performance. For these reasons, the active material particles A and B of the present invention are considered to have maintained a large capacity after charge/discharge cycle was repeated at high temperatures.

In the above embodiment, in preparing the $Co(OH)_2$-coated nickel hydroxide particles, the coating layer was formed by the liquid phase method, but conditions to form the coating layer are not limited to those described above. For example, it is also possible to prepare the active material articles of the present invention by a method of mixing nickel hydroxide particles with a cobalt hydroxide powder and coating the surface of the nickel hydroxide particles with cobalt hydroxide utilizing a shear force or an impact force at the time of mechanical mixing (mechanical mixing method).

In the first step, as a method of oxidizing the $Co(OH)_2$-coated nickel hydroxide particles immersed with an aqueous alkali solution, the particles were charged in a drier equipped with microwave heating means and completely dried while supplying oxygen; however, this is not the only method to be used.

In the second step, the concentration of the aqueous lithium hydroxide solution was 1.0 mol/kg, but the same effects can be obtained as long as the concentration is 0.5 mol/kg or more. The temperature of the aqueous lithium hydroxide solution was 80° C., but the same effects can be obtained when the temperature is in a range of 60 to 95° C. The time of immersing in the aqueous lithium hydroxide solution was 30 minutes, the time is not restricted to this condition.

As described above, the present invention makes it possible to provide an alkaline storage battery that maintains excellent characteristics of the cobalt oxide constituting a coating layer and that causes little capacity reduction even when the charge/discharge cycle is repeated at high temperatures.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A positive electrode material for alkaline storage batteries, comprising nickel hydroxide particles and layers of a cobalt oxide coating surfaces of said nickel hydroxide particles, wherein said cobalt oxide contains potassium ions or sodium ions in the crystal and a cobalt valence of said cobalt oxide is greater than 3.0, and wherein said cobalt oxide fixes lithium hydroxide or lithium ions.

2. The positive electrode material for alkaline storage batteries in accordance with claim 1, wherein said cobalt oxide fixes said lithium hydroxide or said lithium ions by chemical adsorption.

3. The positive electrode material for alkaline storage batteries in accordance with claim 1, wherein said lithium ions are fixed to said cobalt oxide by being incorporated therein to form a solid solution.

4. The positive electrode material for alkaline storage batteries in accordance with claim 1, wherein an atomic ratio of lithium of said lithium hydroxide or lithium ions to cobalt is from 0.10 to 0.50.

5. The positive electrode material for alkaline storage batteries in accordance with claim 1, wherein an atomic ratio of said potassium ions or sodium ions to cobalt is from 0.20 to 0.33.

6. The positive electrode material for alkaline storage batteries in accordance with claim 1, wherein said nickel hydroxide particles have an average particle diameter of 5 to 20 μm, and substantially the entire surface of each of said nickel hydroxide particles is coated with said coating layer.

7. The positive electrode material for alkaline storage batteries in accordance with claim 1, wherein said cobalt oxide comprises a γ-phase cobalt oxyhydroxide.

8. A method of producing a positive electrode material for alkaline storage batteries, comprising:
    a first step of heating nickel hydroxide particles having a coating layer of cobalt hydroxide in the presence of an aqueous solution of either potassium hydroxide or sodium hydroxide whose concentration is greater than 40% by weight, thereby to convert the cobalt hydroxide into γ-phase cobalt oxyhydroxide through air oxidation, said γ-phase cobalt oxyhydroxide containing potassium or sodium ions and having a cobalt valence greater than 3.0, and
    a second step of immersing the particles in an aqueous lithium hydroxide solution wherein a temperature of the aqueous lithium hydroxide solution is from 60° C. to 95° C.

9. The method of producing a positive electrode material for alkaline storage batteries in accordance with claim 8, wherein a concentration of said aqueous lithium hydroxide solution is more than 0.5 mol/kg.

10. A method of producing a positive electrode material for alkaline storage batteries, comprising:
    a first step of heating nickel hydroxide particles having a coating layer of cobalt hydroxide in the presence of an aqueous solution of either potassium hydroxide or sodium hydroxide whose concentration is greater than 40% by weight, thereby to convert the cobalt hydroxide into a cobalt oxide containing potassium or sodium ions and having a cobalt valence greater than 3.0 through air oxidation, and
    a second step of immersing the particles in an aqueous lithium hydroxide solution wherein a temperature of the aqueous lithium hydroxide solution is from 60° C. to 95° C.

11. The method of producing a positive electrode material for alkaline storage batteries in accordance with claim 10, wherein the concentration of said aqueous lithium hydroxide solution is 0.5 mol/kg or more.

* * * * *